United States Patent [19]

Kruishoop

[11] Patent Number: 4,849,640
[45] Date of Patent: Jul. 18, 1989

[54] APPARATUS FOR EXPOSING A UV-CURABLE COATING ON A FILAMENTARY BODY

[75] Inventor: Johan C. W. Kruishoop, Eindhoven, Netherlands

[73] Assignee: U.S. Philips Corporation, New York, N.Y.

[21] Appl. No.: 217,101

[22] Filed: Jul. 6, 1988

Related U.S. Application Data

[63] Continuation of Ser. No. 51,217, May 14, 1987, abandoned, which is a continuation of Ser. No. 873,117, Jun. 10, 1986, abandoned, which is a continuation of Ser. No. 663,606, Oct. 22, 1984, abandoned.

[30] Foreign Application Priority Data

Jul. 4, 1984 [NL] Netherlands ............ 8402124

[51] Int. Cl.$^4$ ............ G02B 5/14; F21V 7/04
[52] U.S. Cl. .............. 250/492.1; 250/504 R; 362/301; 65/2
[58] Field of Search ............ 250/492.1, 504.2, 503.1, 250/453.1; 65/2, 34.3; 362/301, 302, 346, 347; 219/121 LQ, 357, 349

[56] References Cited

U.S. PATENT DOCUMENTS

| | | | |
|---|---|---|---|
| 2,811,732 | 4/1959 | Chrystman | 118/643 |
| 3,981,705 | 9/1976 | Jaeger et al. | 65/2 |
| 3,990,873 | 11/1976 | Knetzlstorfer | 65/2 |
| 4,135,902 | 1/1979 | Oehrle | 65/2 |
| 4,157,256 | 6/1979 | Hernqvist | 65/2 |
| 4,264,349 | 4/1981 | Grey et al. | 65/2 |
| 4,324,575 | 4/1982 | Levy | 65/3.11 |
| 4,389,701 | 6/1983 | Phillips | 362/308 |
| 4,523,806 | 6/1985 | Kojima et al. | 350/96.25 |

OTHER PUBLICATIONS

Smithgall et al., Drawing Lightguide Fiber, Western Elec. Eng., vol. 24, No. 1, (1980).

Primary Examiner—Bruce C. Anderson
Assistant Examiner—Michael Aronoff
Attorney, Agent, or Firm—Norman N. Spain

[57] ABSTRACT

An apparatus is described for exposing a coating of a UV-curable material on a filamentary body to ultraviolet light. Use is made of a bright UV-light source, for example a high-pressure mercury lamp with a small radiating surface, an elongate image of said source being formed at the location of the filamentary body by means of an optical system which preferably comprises mirrors.

8 Claims, 2 Drawing Sheets

APPARATUS FOR EXPOSING A UV-CURABLE COATING ON A FILAMENTARY BODY

This is a continuation of application Ser. No. 051,217, filed May 14, 1987, now abandoned, which is a continuation of application Ser. No. 873,117, filed June 10, 1986, now abandoned, which is a continuation of application Ser. No. 663,606, filed Oct. 22, 1984, now abandoned.

The invention relates to an apparatus for exposing a coating of a UV-curable material on a filamentary body to ultraviolet light, which apparatus comprises an ultraviolet light source.

Such apparatus may be used, for example, in the manufacture of light-conducting glass fibres intended for use in optical telecommunication systems. As is known, these fibres must be provided with a protective coating so as to maintain their tensile strength and to prevent losses as a result of microbends. Suitable materials for such protective coatings are UV-curable materials, which are applied to these fibres in liquid condition and which constitute a protective coating after they have been cured by exposure to UV-radiation. Such materials may also be used for coating a metal wire, for example a copper wire, with an insulating layer.

U.S. patent application No. 4,099,837 describes a light-conducting fibre with a protective coating of a UV-cured polymer and a method of manufacturing this fibre. After the fibre has been drawn from a glass or quartz preform in known manner, it is passed through a vessel containing a UV-curable fluid and subsequently it is exposed to UV-light emitted by two elongate UV-light sources, which are not described in further detail.

Curing is the slowest step in this process, which means that the rate of feed-through of the fibre is dictated by the curing speed. The curing speed increases as the amount of UV-light absorbed by the coating increases. This amount is proportional to the exposure length and the exposure intensity. The brightness of the light source used in the apparatus in accordance with U.S. Pat. No. 4,099,837 is only limited. The apparatus does not employ optical elements which concentrate the light emitted by the light sources onto the fibre. Therefore, only a small portion of the light emitted by the light sources reaches the fibre, so that only a small portion of the light emitted by the light sources is utilized for curing. Consequently, the light sources must have a large length and a substantial amount of power is required for the power supply. In an exposure apparatus equipped with such light sources special steps must be taken for the power supply to and the cooling of the light sources.

The present invention aims at providing an exposure apparatus which is compact and which has a high exposure efficiency for the curing process. The apparatus in accordance with the invention is characterized in that the light source has a high brightness and has a radiating surface whose dimensions are of the order of a few millimetres, and there is provided an optical system for forming an elongate image of the light source at the location of the filamentary body.

The invention is based on the recognition of the fact that for exposing a thin fibre or wire it is advantageous to use the quasi-point shaped radiating surface of a small radiation source by optically transforming this into a quasi-linear image. As a result of this, a substantially larger portion of the emitted light than in the systems known so far will be incident on the filamentary body, so that less electric power is required for the power supply and cooling of the light source, thereby enabling a more compact construction to be obtained.

The "dimensions" of the radiation source, in the case of a cylindrical radiating surface, are the length and the diameter of the cylinder, or the length and width of this surface.

A preferred embodiment of the invention is characterized in that the light source is a high-pressure mercury lamp.

Instead of a high-pressure mercury lamp it is possible to use, for example, a laser which emits UV-light.

The optical system for imaging the light source may comprise a plurality of lenses. Preferably, the apparatus in accordance with the invention is characterized in that the optical system comprises mirrors. In comparison with an optical system comprising lenses, an optical system comprising mirrors, has the advantage that less radiation is absorbed and that the radiation path can be "folded".

It is to be noted that Netherlands Patent Application No. 81-00905, which has been laid open to public inspection, describes an apparatuses for exposing a UV-curable protective coating on a light conducting fibre, in which the UV=light produced by a mercury lamp is reflected to the fibre by a concave elliptical mirror. However, this apparatus employs two mercury lamps which are arranged diametrically relative to the fibre. These lamps are medium pressure mercury lamps with a comparatively large radiating surface and a low brightness.

A preferred embodiment of the invention is characterized in that the optical system comprises a first and a second plane mirror which are arranged at an angle of 90° relative to each other and which cause the optical axis of a first concave elliptical mirror to be displaced parallel to itself, the UV-light source being arranged in the focus of said first concave mirror, and the plane mirrors are followed by, in this order, a second concave mirror in the form of a reflecting solid of revolution whose generetrix is an ellipse and a third concave mirror in the form of a reflecting solid of revolution whose generatrix is a parabola.

The use of two plane mirrors enables the UV-light source to be arranged at some distance from the feed-through path of the fibre and, in addition, enables the radiation path to be folded. The second concave mirror forms a circular image in a plane containing that focus of the ellipse of this mirror which coincides with the focus of the parabola of the third concave mirror, which image is symmetrical relative to the direction of feed-through of the fibre or wire. The third concave mirror ensures that all the light originating from the circular light spot is concentrated in parallel beams which provide a uniform and omnidirectional exposure of the fibre or wire.

In order to ensure that a maximal portion of the light of these beams is utilized for exposure the apparatus in accordance with the invention is preferably characterized further in that the third concave mirror is followed by a cylindrical body which is internally reflecting. The light rays which fall past the fibre or wire at the beginning of the cylindrical mirror are reflected several times by this mirror so that eventually they are incident on the fibre or wire.

The exposure efficiency can be increased further by arranging a plane mirror at the end of the cylindrical body around a feed-through aperture for the filamentary body, the major surface of said mirror extending transversely of the axis of the cylindrical body. This mirror reflects the light which has been reflected outwardly by the lower portion of the cylindrical mirror back into the cylinder.

In accordance with another characteristic feature of the invention the second plane mirror has a transmission of the order of one per cent. The light transmitted by this mirror may be employed in order to facilitate the alignment the fibre or wire in the upper part of the exposure system comprising the third concave mirror and the cylindrical mirror.

For the same purpose the cylindrical reflecting body may have a transmission of the order of one percent.

The invention will now be explained by describing its use in the manufacture of light-conducting fibres. For this reference is made to the drawings, in which.

Figure 1:
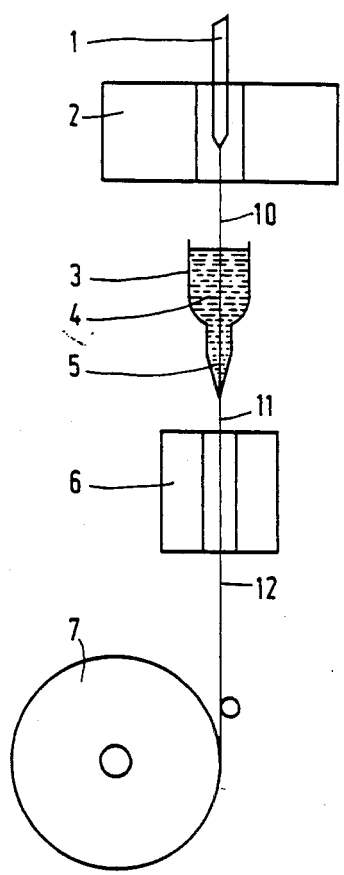
FIG. 1 shows schematically an arrangement for the manufacture of a glass fibre provided with a protective coating, which arrangement comprises an exposure apparatus.

In FIG. 1 the numeral 1 refers to a quartz or glass rod preform from which a light-conducting fibre is to be drawn. The rod is melted in a furnace 2, for example a graphite furnace, and is drawn to a fibre 10 of, for example, 125 $\mu$m diameter. The drawing speed may range from some tens to some hundreds of metres per minute.

For applying a mechanical protective coating the fibre 10 is passed through a vessel 3, shown schematically, which vessel contains UV-curable fluid 4. The fibre 11 which emerges from the aperture 5 is coated with a layer of liquid UV-curable fluid, of, for example, 50 $\mu$m thickness. This fibre is fed through an exposure apparatus 6 in which the coating is cured. Finally, the fibre is wound onto a reel 7.

The invention relates to the exposure apparatus 6. The parts 2, 3, 5 and 7 and the composition of the UV-curable material will not be discussed here.

Figure 3:
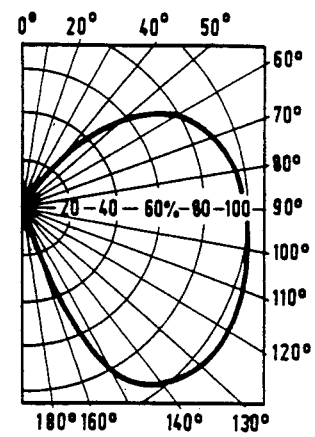
FIG. 3 shows the radiation distribution as a function of the radiation direction of the high-pressure mercury lamp used in said apparatus.
Figure 2:
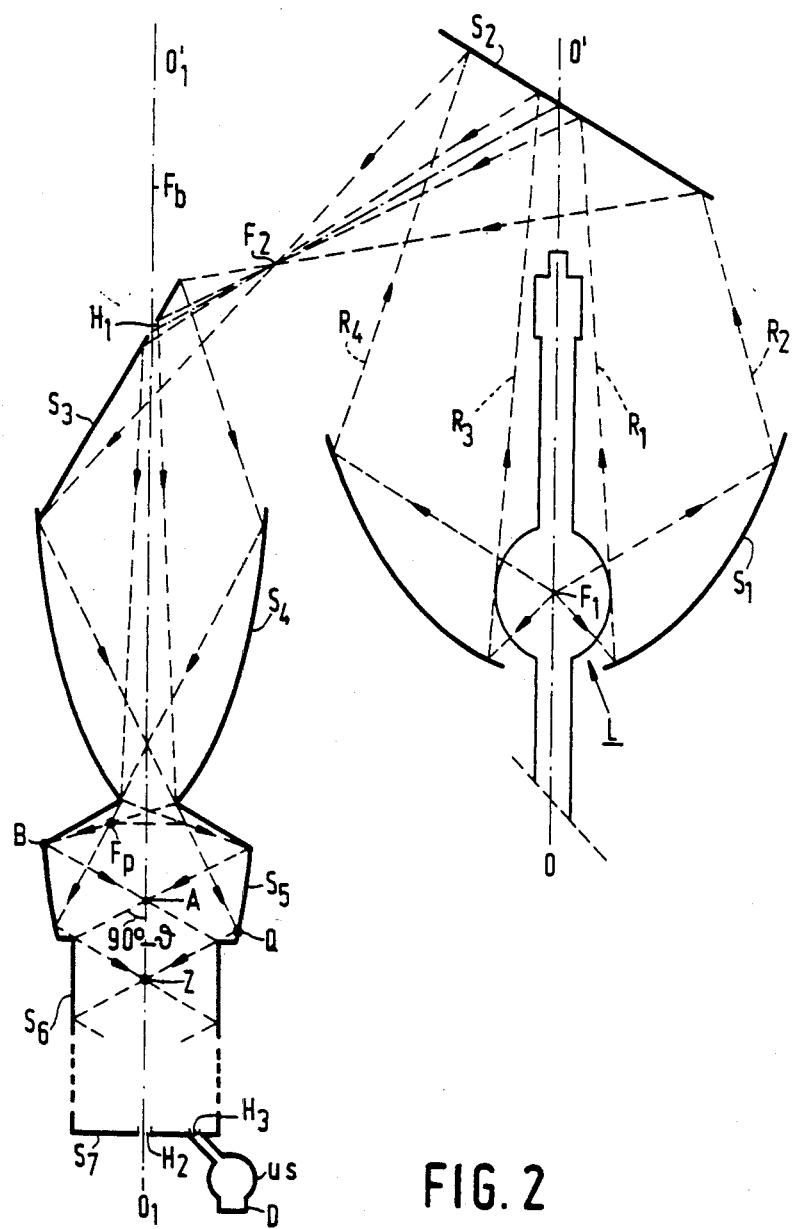
FIG. 2 shows schematically an exposure apparatus in accordance with the invention.

The curing or exposure apparatus is shown in detail in FIG. 2. The apparatus comprises a radiation source in the form of a high-pressure mercury lamp L which is air-cooled or water-cooled. The lamp has, for example, a power of 600 Watts and a small arc core of approximately 0.5×1 mm. FIG. 3 shows the light-intensity distribution as a function of the radiation direction of this lamp.

The optical system for imaging the lamp L on a filamentary body comprises the mirrors $S_1$, $S_2$, $S_3$, $S_4$, $S_5$ and $S_6$. The mirror $S_1$ is a concave elliptical mirror with foci $F_1$ and $F_2$. The arc core of the lamp L is arranged in the focus $F_1$, so that this core is imaged in point $F_2$. The percentage of the light emitted by the lamp L which is focussed by the mirror $S_1$, i.e. in FIG. 2 the light within the marginal rays $R_1$, $R_2$, $R_3$ and $R_4$, is determined by the geometry of this mirror. From the given geometry of $S_1$ and the radiation pattern of FIG. 3 it follows that approximately 85% of the light produced by the lamp is received by the mirror $S_1$.

The elliptical mirror $S_1$ is followed by two plane mirrors $S_2$ and $S_3$ which are arranged perpendicular to each other and which ensure that the optical axis OO' and the radiation path of the beam are rotated through 180°. This is necessary in order to obtain a separation between the position of the lamp and that of the wire or fibre, which is fed through in a vertical direction. The distance over which the optical axis is shifted is minimized in view of a compact construction of the apparatus. The fibre, not shown in FIG. 2, is positioned exactly on the optical axis $O_1O_1'$ of the exposure section. The imaginary fibre is fed into the exposure section through an aperture $H_1$ in the mirror $S_3$ and leaves the exposure section via a second aperture $H_2$.

The divergent beam which issues from the plane mirror $S_3$ is converged by a concave mirror $S_4$. The shape of this mirror may be thought of as being formed by rotating an ellipse having foci $F_b$ and $F_p$ about the optical axis $O_1O_1'$. The mirror $S_4$ re-images the image of the lamp formed by the mirrors $S_1$, $S_2$ and $S_3$ in a circle which is situated in the plane through $R_p$ and transversely of the optical axis $O_1O_1'$.

A third concave mirror $S_5$, whose shape is obtained by rotating a parabola whose focus is $F_p$ and whose major axis is parallel to BQ about the optical axis $O_1O_1'$, ensures that all the light rays from point $F_p$ are concentrated into a beam which, viewed in the plane of drawing, is a parallel beam. The light from all the other points of the circle through $R_p$ is also concentrated into parallel beams by the mirror $S_5$, as is illustrated by FIG. 2 for the light originating from the point which is situated diametrically relative to point $F_p$. Thus, the mirror $S_5$ ensures a direct and uniform exposure at an angle of $90° - v$ of a fibre which is disposed on the optical axis $O_1O_1'$ over a length $A_Z$. Apart from by the angle $v$ and the length $A_Z$, the parameters of the mirrors $S_4$ and $S_5$ are dictated by the requirement that all the light rays which are intercepted by the mirror $S_1$ should be reflected by the other mirrors in the following manner.

A part of the light of the parallel beams originating from the mirror $S_5$ does not reach the fibre. In order to ensure that this light is also used for curing, a further mirror $S_6$ in the form of an internally reflecting hollow cylindrical body may be arranged behind the mirror $S_5$. The light which is not absorbed by the coated fibre within the path $A_Z$ is reflected several times within the mirror $S_6$, which is also referred to as a light oven, and is eventually focussed on the optical axis $O_1O_1'$ so as to be utilized for the curing process.

The exposure efficiency can be increased further by arranging a plane mirror $S_7$ at the bottom of the cylindrical mirror 6. This plane mirror reflects the light which would be reflected outwards by the lower part of the cylindrical mirror back into the cylinder, so that this light is also available for exposure of the coating on the fibre.

In addition to an aperture $H_2$ for the passage of a fibre or wire the lower mirror $S_7$ may have a second aperture $H_3$ which communicates with a so-called Ulbricht-sphere US and a detector D. This enables the light intensity in the cylindrical mirror to be measured, in order to ascertain whether the mirrors have degraded as a result of soiling or whether the brightness of the UV-lamp has decreased.

The reflection coefficient of the plane mirror $S_3$, which may comprise a glass plate on which aluminum has been vapour-deposited, may be selected to differ slightly, for example 1%, from 1, thus enabling the interior of the cylindrical mirror to be observed through this plane mirror. In this way the position of the fibre or wire in the upper part of the exposure section can be observed in order to determine whether adjustments are necessary.

Alternatively, the mirror $S_6$ may be constructed so that it transmits some light, for example a few percent, so as to enable the position of the fibre within this mirror to be observed. The mirror $S_6$ may comprise a glass tube which is internally provided with a vapour-deposited aluminum layer with a transmission of a few per cent. Alternatively, the aluminum layer may be 100% reflecting and the layer may be formed with two gaps having a width of, for example, 2 mm which are 90° spaced from each other, through which gaps the fibre can be observed.

In order to preclude soiling of the mirrors by coating particles a quartz tube may be arranged in the exposure section, through which tube the fibre or wire is fed. If necessary, this tube may then be cleaned separately without requiring realignment of the entire exposure system.

A practical version of an exposure apparatus in accordance with the invention enables coatings on a fibre to be cured correctly at a feed-through rate which may range between approximately 80 and approximately 140 metres per minute depending on the composition of the coating.

The invention has been described for an apparatus for the manufacture of a light-conducting fibre but is not limited to such apparatus. The invention may be employed in all cases where a filamentary body must be provided with a coating of a UV-curable material. An example of this is a copper wire on which an insulating coating of a UV-curable material must be formed.

What is claimed is:

1. An apparatus for exposing a UV curable coated filamentary body to ultraviolet radiation which apparatus comprises an ultraviolet radiation source and an optical system for providing a quasi-linear image of said radiation source on the curable coated filamentary body while said filamentary body is being fed through said apparatus in a given direction along a given axis wherein the radiation source has a high brightness and a small radiating surface, the dimensions of which surface are on the order of a few millimeters, and the optical system providing the image on the filamentary body consists essentially of stationary planar reflective means for forming a virtual image of said source on said axis followed by rotationally symmetrical radiation converging means, said radiation converging means comprising a stationary concave mirror having an entrance and an exit opening for radiation from said planar reflective means and which forms an internally reflecting toric body, the axis of revolution of said body coinciding with said axis of feed-through of said filamentary body and having an elliptical shape in a plane coinciding with said axis and a circular shape in the plane perpendicular to said axis, said elliptical shape forming part of an ellipse with two focal points, the first focal point coinciding with said image and the second focal point being spaced from said axis of revolution and located on a circle transverse to and surrounding the axis of revolution of said body and located near an exit opening in said concave mirror and which circle appears, during operation of said apparatus, as a bright circular spot surrounding said axis of revolution of said body and positioned near said exit opening.

2. An apparatus as claimed in claim 1 characterized in that the ultraviolet radiation source is a high-pressure mercury lamp.

3. An apparatus as claimed in claim 1 characterized in that the optical system comprises mirrors.

4. An apparatus for exposing a coating of UV-curable material on a filamentary body to ultraviolet light, which apparatus comprises an ultraviolet light source, characterized in that the light source has a high brightness and has a small radiating surface whose dimensions are of the order of a few millimeters and which light source is provided with an optical system for forming an elongate image of the light source at the location of the filamentary body, said optical system comprising a first and a second plane mirror which are arranged at an angle of 90° relative to each other and which cause the optical axis of a first concave elliptical mirror to be displace parallel to itself, the UV-light source being arranged in the focus of said first concave mirror, and in said optical system the plane mirrors are followed by, in this order, a second concave mirror in the form of a reflecting solid of revolution whose generatrix is an ellipse and a third concave mirror in the form of a reflecting solid of revolution whose generatrix is a parabola.

5. An apparatus as claimed in claim 4, characterized in that the third concave mirror is followed by a cylindrical body which is internally reflecting.

6. An apparatus as claimed in claim 5, characterized in that a plane mirror is arranged at the end of the cylindrical body around a feed-through aperture for the filamentary body, the major surface of said mirror extending transversely of the axis of the cylindrical body.

7. An apparatus as claimed in claim 4, characterized in that the second plane mirror has a transmission of the order of one percent.

8. An apparatus as claimed in claim 4, characterized in that the cylindrical reflecting body has a transmission of the order of one per cent.

* * * * *